United States Patent [19]

Stinson et al.

[11] 4,393,098

[45] Jul. 12, 1983

[54] PROCESS FOR DEVELOPING A COATING FILM ON A HEATED GLASS SHEET

[75] Inventors: Wilbur G. Stinson, Southgate; Lawrence J. Schwei, Ypsilanti; Sandy T. S. Vong, Ann Arbor, all of Mich.

[73] Assignee: Ford Motor Company, Dearborn, Mich.

[21] Appl. No.: 425,195

[22] PCT Filed: Jul. 29, 1982

[86] PCT No.: PCT/US82/01036
§ 371 Date: Jul. 29, 1982
§ 102(e) Date: Jul. 29, 1982

[51] Int. Cl.³ .................. B05D 1/12; C03C 17/23
[52] U.S. Cl. ................... 427/168; 65/60.52; 427/110; 427/160
[58] Field of Search ............. 65/60.52; 427/160, 168, 427/110

[56] References Cited

U.S. PATENT DOCUMENTS 3,081,200 3/1963 Tompkins .
3,852,098 12/1974 Bloss et al. .
4,182,783 1/1980 Henery ...................... 118/719 X
4,188,199 2/1980 Van Lagthem et al. ....... 118/305 X
4,320,271 10/1980 Marcault ..................... 118/308 X

FOREIGN PATENT DOCUMENTS 2529076 3/1976 Fed. Rep. of Germany .
2529077 3/1976 Fed. Rep. of Germany .
2529079 3/1976 Fed. Rep. of Germany .

*Primary Examiner*—James R. Hoffman
*Attorney, Agent, or Firm*—William E. Johnson; Olin B. Johnson

[57] ABSTRACT

A process is disclosed for developing a coating film on a surface of a sheet of glass. Generally the sheet of glass is heated to a temperature in the range of 510°–625° C. The process is characterized by the step of engaging the surface of the heated glass sheet with a powder spray composition. The powder spray composition comprises a plurality of hollow, generally spherical particles. Each of the particles is formed from heat decomposable, organo-metallic salts of at least two metals. Preferred teachings indicate that the organo-metallic salts are salts of cobalt, iron and chromium.

7 Claims, 2 Drawing Figures

PROCESS FOR DEVELOPING A COATING FILM ON A HEATED GLASS SHEET

TECHNICAL FIELD

This invention relates to a process for developing a coating film on a surface of a sheet of glass, the sheet of glass being at a temperature in the range from 510° C. to 625° C. In particular, the process has been developed for placing such a coating film on a sheet of glass as that sheet is being moved in a selected direction from a glass manufacturing process. The inventive process is one in which the surface of the heated glass sheet is engaged with a powder spray composition which comprises a plurality of hollow, generally spherical particles which are formed from heat decomposable, organo-metallic salts of at least two metals. The coating film is placed on the sheet of glass so as to alter the light transmission characteristics of that glass sheet.

BACKGROUND ART AND PRIOR ART STATEMENT

A history of the pyrolytic application of powder coatings to the surface of a glass sheet is set forth hereinbelow.

U.S. Pat. No. 3,081,200, in column 3, line 13, shows that the patentee has sprayed both solutions and powder in order to form pyrolytic metal oxide coatings on a heated glass sheet. The patent examples, however, are directed to solutions of coating materials and no specific instructions are contained in the patent with respect to how one successfully accomplishes the application of powders to form a pyrolytic metal oxide film on a glass sheet. Also, the patent contains no instructions with respect to the manner of making up a powder which may be successfully applied to a glass sheet to form a pyrolytic coating film thereon.

German Pat. Nos. 2,529,076; 2,529,077; and 2,529,079 deal with the development of a metal oxide film on a glass sheet.

In German Pat. No. 076, metal salt particles are charged prior to application to a glass sheet which has been preheated to a temperature in the range from 500°–650° C. The patent indicates that heat decomposable, organic based metal salts may be used and that a preheated carrier gas may be used for transporting the particles to the glass sheet. The patent teaches that the particles should be charged and distributed in a 90° downwardly directed attitude toward the glass sheet from a gas distributor which extends transverse to the direction of travel of the glass sheet passing therebelow.

German Pat. No. '077 discloses a process for forming a metal oxide film on a glass sheet by pyrolytic techniques. The starting material is a powder metal compound which is carried by an inert carrier gas into a cyclone where the smallest particles of the compound are separated from the coarser particles, subsequently carried along by the carrier gas flow to the surface of the glass sheet to be coated. The coarser particles are collected then partly evaporated under an inert atmosphere by heating. Thereafter, the resulting metal compound vapors are mixed with the carrier gas which carries the finer particles to the surface to be coated. Thus the patent teaches the simultaneous application of both relatively fine heat decomposable, organic based metal salts and vaporized material of the same nature to the glass surface which is to have a metal oxide film developed thereon.

German Pat. No. '079 discloses a method in which relatively large particles of a heat decomposable material are dropped on a glass sheet to develop a film thereon.

U.S. Pat. No. 3,852,098 discloses a process in which a glass sheet is coated with a metal containing film by heating the glass and contacting the hot glass with a gaseous mixture. The patent does not deal with the application of powder materials directly to the surface of the glass to develop a metal oxide coating thereon. Rather, the process disclosed is one which uses as the coating media a gaseous mixture containing 40–100% by volume of the vapors of a reactive metal compound. The mixture is heated by the glass to a sufficient temperature, causing the metal vapor compound to react, thereby depositing the coating film.

U.S. Pat. No. 4,182,783 is a patent directed to a vapor deposition process for achieving a metallic oxide film on a glass sheet. The method discloses fluidizing particulate solid coating reactants by first establishing a fluidized bed of dispersed particulate solid coating reactants and thereafter drawing a volume of fluidized gas and suspended particulate solid coating reactants to a vaporizer. An additional volume of gas is mixed therewith and then all of the particulate solid coating reactants are vaporized in the reactant/gas mixture. This reactant/gas mixture is then directed into contact with a hot substrate to be coated to deposit a film thereon.

U.S. Pat. No. 4,188,199 discloses a process for forming a metal compound coating on the face of a continuously longitudinally moving glass ribbon. The ribbon face is contacted while at an elevated temperature with a fluid medium containing a substance which undergoes chemical reaction or decomposition to form the metal compound on the surface of the moving glass ribbon.

U.S. Pat. No. 4,230,271 discloses an apparatus for evenly and uniformly depositing particulate material suspended in a gas on at least one surface of a glass sheet. In particular, the glass sheet may be a strip of glass and the product placed thereon a metal salt.

The principal of the process of the present invention is to provide a process for developing a coating film on the surface of a sheet of glass, the glass sheet being heated to a temperature in the range of 510°–625° C. This process is characterized by engaging the surface of the heated glass sheet with a special heat decomposable powder spray composition.

DISCLOSURE OF THE INVENTION

This invention is directed to a process for developing a coating film on a surface of a sheet of glass. In particular, the process is directed to such a film developing process for application of a film to a sheet of glass which is heated to a temperature in the range of 510°–625° C. As such, the coating film is developed on the surface of the glass sheet by pyrolytic coating techniques.

In accordance with the teachings of this invention, the surface of the heated glass sheet is engaged with a powder spray composition which comprises a plurality of hollow, generally spherical particles which are formed from heat decomposable, organo-metallic salts of at least two metals.

In accordance with more detailed teachings of the method of this invention, the generally spherical particles are homogeneous in that they have a metallic compositional makeup of approximately the same ratio. In accordance with further details of the method of this invention, the average spherical particle size is about 6 microns.

In accordance with the details of a preferred embodiment of the method of this invention, the surface of the heated glass sheet is engaged with a powder spray composition which comprises a plurality of hollow, generally spherical particles which are formed from heat decomposable, organo-metallic salts of cobalt, iron and chromium.

In accordance with still greater details of the preferred embodiment of this invention, the generally spherical particles are homogeneous in that they have a metallic compositional makeup of approximately the same ratio. The preferred ratio disclosed is approximately 70% cobalt, 19% iron, and 11% chromium. Once again, for this preferred compositional makeup, the preferred particle size is about 6 microns.

BRIEF DESCRIPTION OF THE DRAWINGS

The novel features that are considered characteristic of the invention are set forth with particularlity in the appended claims. The invention itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

BEST MODE AND INDUSTRIAL APPLICABILITY

Figure 1:
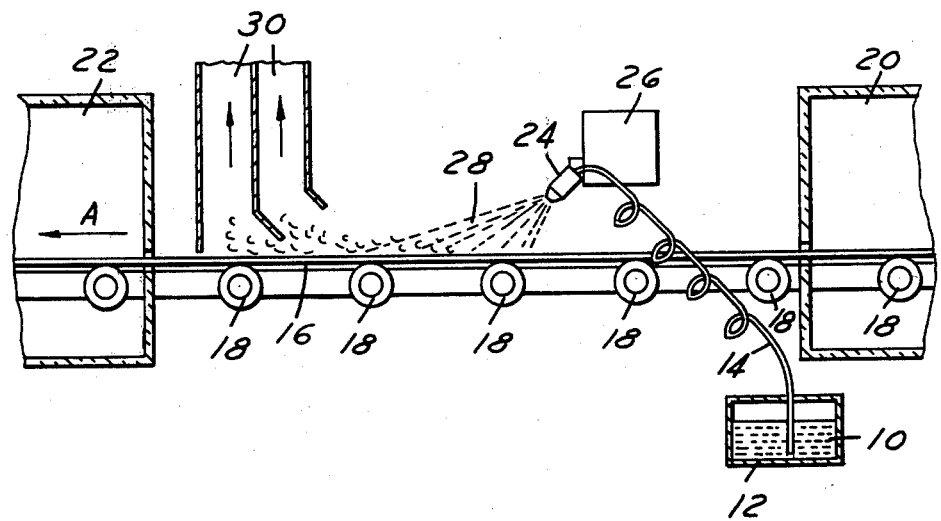
FIG. 1 is a schematic view in elevation of apparatus in which the method of this invention may be carried out.
Figure 2:
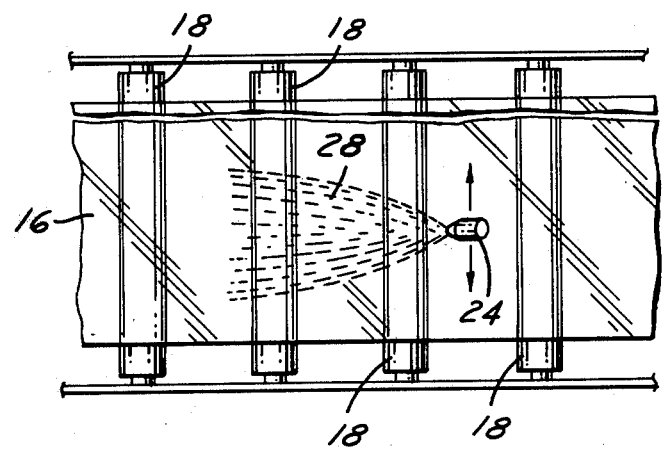
FIG. 2 is a plan view of the apparatus of FIG. 1.

The following description is what we consider to be a preferred embodiment of our process of developing a coating film on the surface of a sheet of glass. The following description also sets forth what we now contemplate to be the best mode of carrying out the process of this invention. This description is not intended to be a limitation upon the broader principles of this process and, while preferred materials are used to illustrate the process in accordance with the requirements of the patent laws, it does not mean that the process is operative only with the stated materials as others may be substituted therefor. Also, for example, the process disclosed may be successfully used with materials yet to be developed by skilled artisans such as newly developed heat pyrolyzable metallic salts. It is therefore contemplated by us that the process disclosed in this specification may also be successfully used with materials which are yet to be developed because the principles of operation of the process remain the same, regardless of the particular materials used with the process.

The process of this invention will be illustrated by spraying techniques set forth in U.S. application Ser. No. 325,891, filed Nov. 30, 1981, entitled "METHOD OF PLACING A METALLIC OXIDE FILM ON A SURFACE OF A HEATED GLASS SUBSTRATE". The noted application discloses a process for applying pulverized organo-metallic powders to the surface of a heated sheet of glass. The processing techniques for applying such pulverized particles may also be used for applying the hollow, generally spherical particles used with the process of this invention.

We will now disclose a preferred method of preparing a preferred composition of a powder spray composition which comprises a plurality of hollow, generally spherical particles, each particle being formed from heat decomposable, organo-metallic salts of at least two metals. The processing technique we prefer is a spray drying process. This particular process is initiated by mixing together a pulverized powder mixture which consists of about 70% by weight cobaltic acetylacetonate, 18% by weight ferric acetylacetonate, and 12% by weight chromic acetylacetonate. In order to form a solution, 19% by weight of the pulverized powder mixture is mixed with 81% by weight of a technical grade of methylene chloride to form a solution.

In order to form the plurality of hollow, generally spherical particles, each particle being formed from heat decomposable, organo-metallic salts of the preferred composition of colbalt, iron and chrome, the solution is spray dried. In accordance with one spray drying technique, 19.1 pounds per minute of the solution to be spray dried was fed to an open cycle spray dryer manufactured by Bowen Engineering, Inc. This spray dryer was heated indirectly by steam and had a centrifugal atomizer. The air inlet temperature was 100° C. with the outlet air temperature being in a range of 58°–61° C. The atomizer speed was set at 21,000 rpm.

The powder spray composition produced by this processing technique comprised a plurality of hollow, generally spherical particles. Each of these particles were formed from heat decomposable, organo-metallic salts of cobalt, iron and chrome in approximately the same ratio in each particle. Under the conditions set forth above, the preferred ratio of materials in each particle was approximately 70% cobalt, 19% iron, and 11% chrome. While each of the particles generally contain the above ratio and thereby characterizes the overall spray material as being very homogeneous, it is, of course, readily apparent that in any physical processing step some of the particles may not achieve the overall homogeneity which is demonstrated by the great bulk of the spray composition. By being very homogeneous, in this specification, we mean that at least 85–90% of the particles generally will have the same average metallic composition within normal statistical ratios.

One of the other characteristics of this powder is what we call the shape factor. This factor is a measure of sphericity, with a perfect sphere (a circle in two dimensions) having the maximum shape factor of one. The analysis is done on an image analyzer. In accordance with the powder made as above described, the shape factor is as follows:

| Shape Factor | Percent Distribution |
| --- | --- |
| 0.9–1.0 | 71.2 |
| 0.8–0.9 | 12.3 |
| 0.7–0.8 | 5.6 |
| 0.6–0.7 | 3.9 |
| 0.0–0.6 | 7.0 |

Another way of characterizing the spray composition made as above described is the particle size distribution. In the preferred composition the particle size distribution is at a mean particle size of 6 microns. The particle size distribution is as set forth below:

| Size Range, Microns | Percent Distribution |
| --- | --- |
| less than 2 | 10.2 |
| 2–4 | 32.7 |
| 4–6 | 23.3 |
| 6–8 | 12.1 |
| 8–10 | 7.2 |
| 10–12 | 4.1 |
| 12–14 | 3.0 |
| 14–16 | 1.8 |
| greater than 16 | 5.6 |

Having thus described a preferred way of generating a preferred powder spray composition, we will now describe the preferred manner in which that spray composition is applied to a sheet of glass. The particular application method follows the method set forth in the aforementioned U.S. application Ser. No. 325,891.

The powder spray composition formed as above described is stored as a supply of dry powder spray composition 10 in a powder composition supply device 12. In a manner well known in the art, the dry powder 10 is entrained in a gaseous stream, such as a stream of air, and then moved through a supply tube 14. In this manner the dry powder 10 is delivered by means of the supply tube 14 to a location spaced above a glass sheet 16. The glass sheet is supported on movable rolls 18—18 for movement in the direction of arrow A of FIG. 1.

The glass sheet is moved from a float chamber 20 in which the sheet is manufactured to and through an annealing lehr 22 in which the glass is cooled and annealed in a manner well known. The method of our invention in this preferred embodiment takes place in the location spaced between the float chamber and the annealing lehr. In this location the glass sheet has a temperature in the range of 370° C. (700° F.) to 650° C. (1200° F.). This temperature range is sufficiently high to vaporize the organic based powder spray composition so that the metals forming the same may react with oxygen in the ambient surrounding the glass sheet or with oxygen in the glass sheet itself in order to form a metallic oxide film on the glass sheet 16.

At a location spaced above the surface of the glass sheet 16, there is a spray nozzle 24. This spray nozzle is attached to a spray nozzle reciprocating device 26 which moves in the spray nozzle back and forth across the width of the glass sheet passing therebelow. The spray nozzle is located at a 30° to 45° angle with respect to the glass sheet passing therebelow, and the distance of the nozzle on the direct path from the gun to the glass is 22.8–30.5 centimeters (9–12 inches). With the particular composition used the film placed on the glass substrate will have a composition of approximately 66–69% cobalt, 7–9.2% chrome, and 22.5–25.5% iron.

Chemical and physical durability of this film composition can be measured by two separate tests. The chemical durability is measured by a first procedure in which a coated sample is subjected to a five hour hydrochloric acid vapor test. In this case, hydrochloric acid vapor surrounded the material and attempted to attack the coating on the glass sheet. An attack of the coating changes the level of transmission of solar energy through the glass. There is a greater amount of energy transmitted as the durability of the film is attacked. The change in transmission characteristics of the coated glass to the transmission of energy therethrough is considered acceptable if it is in a range of 15% or less, any greater change of the film being considered unacceptable. In this case the change was less than 1% for the film composition and was therefore considered very acceptable.

The second test is a test of physical durability. In this test the sample is initially heat tempered. Thereafter the tempered test sample is subjected to a humidity test in which the sample is subjected to a 100% humidity at 49° C. (120° F.) for a period of six weeks. The high humidity can cause the coating on the surface to loosen its adherence to the surface and come free. The measurement of durability is that the surface coating stays in place for the prolonged period of time and no less than 1% of the coating is removed therefrom. If any greater amount of material is removed, the sample is rejected as failed. In this case the change was again less than 1% for the above described film composition.

The spray nozzle 24 is designed so that additional air is added to the spray composition being carried in the supply tube 14. The purpose of adding the air is to accelerate the spray powder from the location of the gun spaced above the moving glass sheet 16. The acceleration is accomplished by entraining the spray composition in a high velocity stream of air which causes individual particles of the spray composition both to be accelerated to velocities in the range of 6 meters per second (20 feet per second) to 36 meters per second (120 feet per second) and to separate the individual particles of the spray powder. The acceleration is accomplished by a commercially available device called a transvector which has a capability of amplifying the air coming out of the nozzle of the transvector 20 times its input air volume.

A fan shaped spray 28 is thereby developed for the spray composition. Because of the fan shaped spray generated by accelerating the entrained spray composition as discussed above, two things can happen to individual spherical particles of the spray powder. A first thing that can happen is that particles can be rapidly brought to a location in juxtaposition to the surface of the glass sheet 16 whereat these individual particles are vaporized, decomposed and reacted with oxygen to form a tightly adherent coating on the glass sheet. A second thing that can happen to these particles is that they are rapidly exhausted from the location in juxtaposition to the surface of the glass sheet because these individual particles fail to vaporize, decompose or react within an acceptable residence time required for forming a tightly adherent coating on the moving glass substrate. An exhaust hood 30, shown only in FIG. 1, is used for withdrawing the exhausted spray powder from engagement with the surface of the glass sheet.

We have found that by using the spray composition, which comprises a plurality of hollow, generally spherical particles, with each of the particles being formed from heat decomposable, organo-metallic salts of at least two metals, an improved film is generated on the surface of the glass sheet as when compared with a film generated by spraying a nonhomogeneous dry powder mixture. One way that we have found improvement is in an area which is generally known in the art as "mottle". Mottle is a small, localized difference in transmission characteristics of a glass sheet.

While mottle is a subjective measurement, we have attempted to keep the subjectivity of that measurement as low as possible by having a single person rate the mottle of all samples generated. A good mottle rating is 1, and a poor mottle rating is 7. A mottle rating of 7 would mean that the glass was filled with many areas of different localized transmission. In layman's terms it would be like a sheet of glass left out in a rainstorm and dirt accumulates on the surface thereof. When one then looks through the glass sheet all the localized areas of different transmission because of the dirt on the glass would be noted.

When pulverized, nonhomogeneous dry powder materials are used to make the film, the mottle rating is normally on the average of 4-5. However, when the powder spray composition is formed from a plurality of hollow, generally spherical particles, the mottle rating on the average is in the range from 2-3, and quite often is as low as 1.5. This is a substantial improvement over the mottle rating achieved using pulverized material, and is a mottle rating which would permit commercial sale of the glass.

While particular embodiments of the process of this invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A process for developing a coating film on a surface of a sheet of glass, the sheet of glass being at a temperature in a range of 510°-625° C., which process is characterized by the step of:
   engaging the surface of the heated glass sheet with a spray powder composition which comprises a plurality of hollow, generally spherical particles, each particle generally being formed from heat decomposable, organo-metallic salts of at least two metals.

2. The process of claim 1, wherein each of said plurality of hollow, generally spherical particles are generally homogeneous in that they have a metallic compositional makeup of approximately the same ratio.

3. The process of claim 1 or claim 2, wherein the average spherical particle size is about 6 microns.

4. A process for developing a coating film on the surface of a sheet of glass, the sheet of glass being at a temperature in a range of 510°-625° C., which process is characterized by the step of:
   engaging the surface of the heated glass sheet with a powder spray composition which comprises a plurality of hollow, generally spherical particles, each particle generally being formed from heat decomposable, organo-metallic salts of cobalt, iron and chromium.

5. The process of claim 4, wherein each of said plurality of hollow, generally spherical particles are generally homogeneous in that they have a metallic compositional makeup of approximately the same ratio.

6. The process of claim 5, wherein the metallic compositional makeup of said particles is approximately 70% cobalt, 19% iron, and 11% chrome by weight.

7. The process of claim 5 or claim 6, wherein the average spherical particle size is about 6 microns.

* * * * *